(12) United States Patent
Thompson

(10) Patent No.: US 10,919,594 B2
(45) Date of Patent: Feb. 16, 2021

(54) FOLDABLE BICYCLE AND STORAGE SYSTEM

(71) Applicant: Ford Global Technologies, LLC, Dearborn, MI (US)

(72) Inventor: Thomas Robert George Thompson, Brentwood (GB)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 187 days.

(21) Appl. No.: 16/073,422

(22) PCT Filed: Jan. 27, 2016

(86) PCT No.: PCT/US2016/015082
§ 371 (c)(1),
(2) Date: Jul. 27, 2018

(87) PCT Pub. No.: WO2017/131656
PCT Pub. Date: Aug. 3, 2017

(65) Prior Publication Data
US 2019/0061862 A1 Feb. 28, 2019

(51) Int. Cl.
*B62K 15/00* (2006.01)
*B62M 6/40* (2010.01)
(Continued)

(52) U.S. Cl.
CPC .............. *B62K 15/006* (2013.01); *B62J 7/04* (2013.01); *B62J 7/06* (2013.01); *B62K 3/04* (2013.01);
(Continued)

(58) Field of Classification Search
CPC ................ B62K 15/006; B62K 15/008; B62K 2015/001; B62J 7/04
See application file for complete search history.

(56) References Cited

U.S. PATENT DOCUMENTS 3,374,009 A * 3/1968 Jeunet .................. B62K 15/006
280/287
4,768,798 A 9/1988 Reed et al.
(Continued)

FOREIGN PATENT DOCUMENTS

| CN | 101746459 A | 6/2010 |
| CN | 201932311 U | 8/2011 |

(Continued)

OTHER PUBLICATIONS

International Search Report and Written Opinion dated Mar. 31, 2016 re International Appl. No. PCT/US2016/015082 filed 127/2016.

(Continued)

*Primary Examiner* — Ruth Ilan
*Assistant Examiner* — Harold Eric Pahlck, III
(74) *Attorney, Agent, or Firm* — Brandon Hicks; Bejin Bieneman PLC

(57) ABSTRACT

A bicycle frame assembly includes a frame including a first segment, a second segment connected to the first segment at a first hinge, and a third segment connected to the second segment at a second hinge. A synchronization cable extends through the second segment from the first hinge to the second hinge.

15 Claims, 12 Drawing Sheets

(51) Int. Cl.
  *B62J 7/06* (2006.01)
  *B62J 7/04* (2006.01)
  *B62K 3/04* (2006.01)
  *B62K 3/10* (2006.01)
  *B62K 3/02* (2006.01)

(52) U.S. Cl.
  CPC .............. *B62K 3/10* (2013.01); *B62K 15/00* (2013.01); *B62M 6/40* (2013.01); *B62K 3/02* (2013.01); *B62K 2015/001* (2013.01)

(56) References Cited

U.S. PATENT DOCUMENTS

| | | | | |
|---|---|---|---|---|
| 5,052,706 A | * | 10/1991 | Tsai | B62K 15/006 280/278 |
| 5,440,948 A | | 8/1995 | Cheng | |
| 6,364,334 B1 | * | 4/2002 | Kuba | B62K 15/00 280/287 |
| 7,140,629 B2 | | 11/2006 | Chen | |
| 8,162,345 B1 | | 4/2012 | Szu-Yao | |
| 8,430,414 B1 | * | 4/2013 | Yap | B62K 15/008 280/278 |
| 8,602,436 B2 | | 12/2013 | Montero Basqueseaux | |
| 9,272,739 B2 | * | 3/2016 | Zaid | B62K 3/002 |
| 9,475,538 B2 | | 10/2016 | Wang et al. | |
| 9,878,758 B2 | * | 1/2018 | Lee | B62K 15/008 |
| 9,963,186 B2 | * | 5/2018 | Beistegui Chirapozu | B62K 15/008 |
| 2007/0210556 A1 | | 9/2007 | Hon et al. | |
| 2008/0116659 A1 | | 5/2008 | Seaman | |
| 2008/0277901 A1 | | 11/2008 | Catelli | |
| 2011/0068560 A1 | | 3/2011 | Wilson et al. | |
| 2013/0068549 A1 | | 3/2013 | Laprade | |
| 2013/0153321 A1 | | 6/2013 | Preining et al. | |
| 2014/0139011 A1 | * | 5/2014 | Ko | B29C 69/02 301/64.101 |
| 2015/0060176 A1 | | 3/2015 | Paick | |
| 2016/0236744 A1 | * | 8/2016 | Bailie | B62K 3/02 |
| 2016/0244246 A1 | * | 8/2016 | Gerencser | B65D 85/68 |
| 2017/0247076 A1 | * | 8/2017 | Uimonen | B62K 21/12 |
| 2019/0061862 A1 | | 2/2019 | Thompson | |

FOREIGN PATENT DOCUMENTS

| | | | |
|---|---|---|---|
| CN | 104627297 A | | 5/2015 |
| JP | 200381169 A | | 3/2003 |
| WO | 199921750 A1 | | 3/1999 |
| WO | 200236419 A1 | | 10/2002 |

OTHER PUBLICATIONS

International Preliminary Report on Patentability dated Aug. 9, 2018 re International Appl. No. PCT/US2016/015082 filed Jan. 27, 2016.

Vlad Hristeve, "Self-folding electric bicycle on Behance", https://www.behance.net/gallery/10166322/Self-folding-electric-bicycle.

Non-Final Office Action dated Jun. 15, 2020 for U.S. Appl. No. 16/073,383 (15 pages).

* cited by examiner

FOLDABLE BICYCLE AND STORAGE SYSTEM

BACKGROUND

A bicycle may be foldable to reduce storage space of the bicycle when not in use. This reduction of space is valuable for both individual owners of bicycles, as well as for companies that rent bicycles, and thus store a large amount of bicycles in a single location. However, such foldable bicycles are often cumbersome and complicated to move between folded and unfolded positions. For example, the folding process for such bicycles may require that the user support the bicycle during the folding, which may be too heaving for some users. In addition, once folded, many bicycles are inoperable until being unfolded. As such, the remains an opportunity to design a foldable bicycle that is folded in a simple and ergonomic fashion.

DETAILED DESCRIPTION

Figure 1:
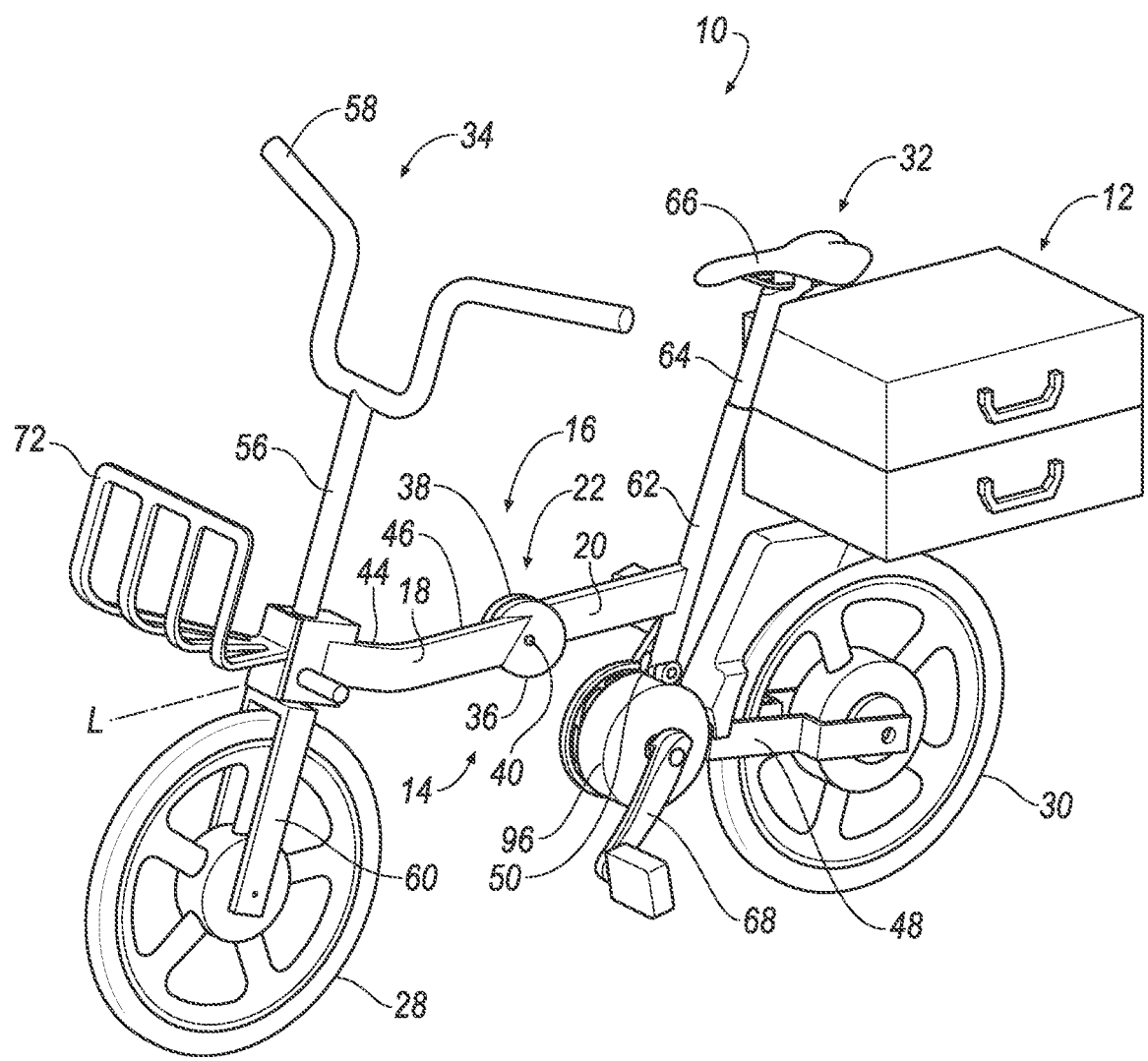
FIG. 1 is a perspective view of a bicycle in an unfolded position.
Figure 2:
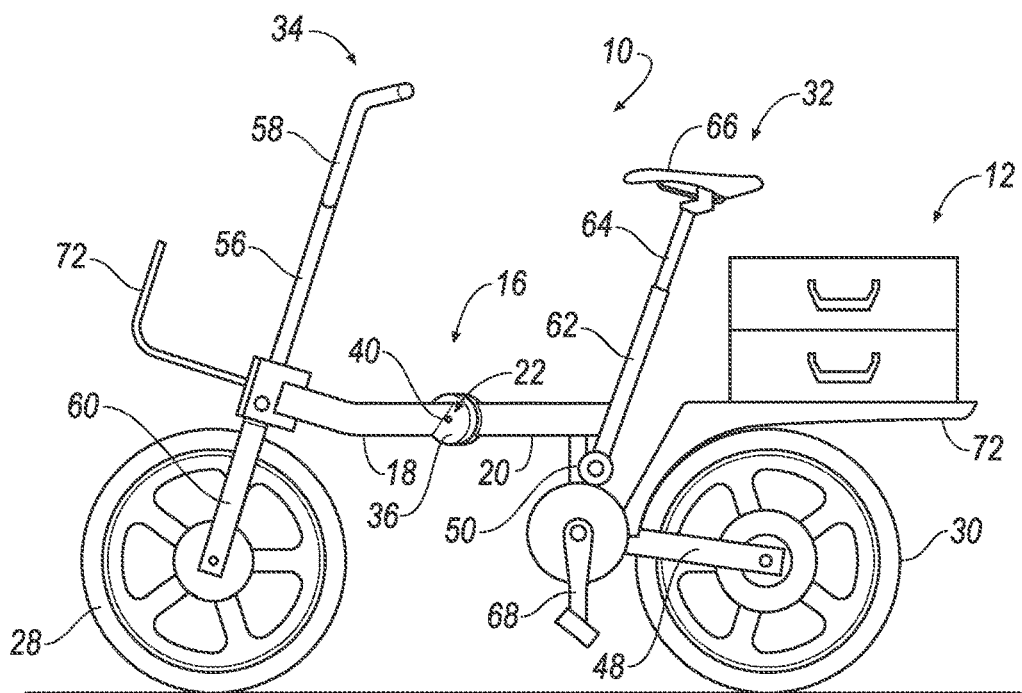
FIG. 2 is a side view of the bicycle in the unfolded position.
Figure 3:
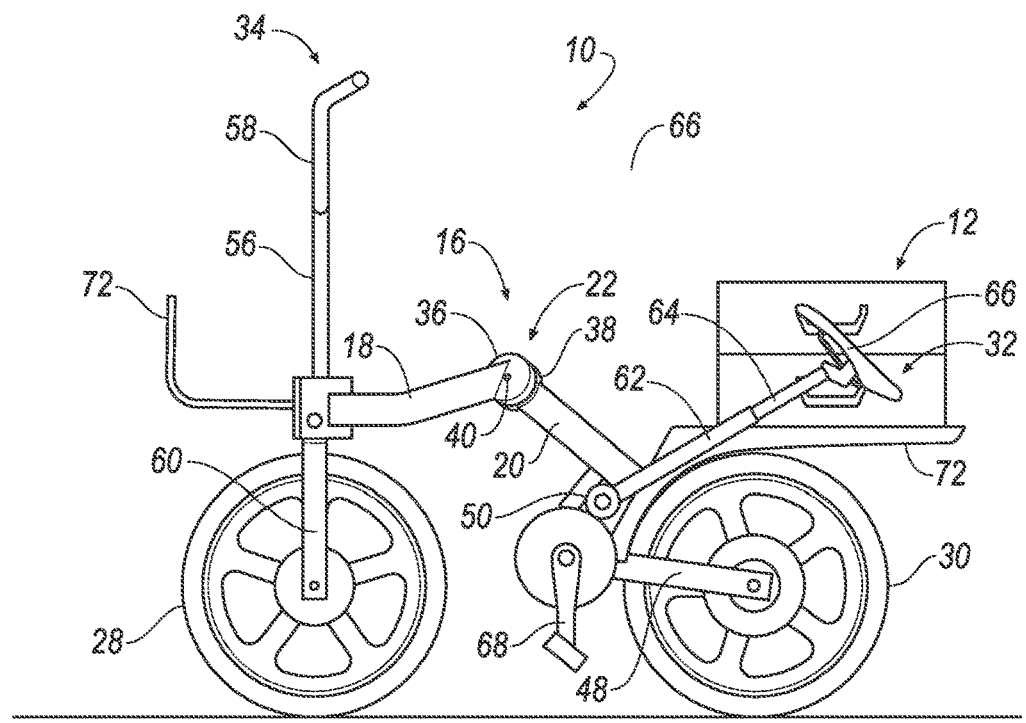
FIG. 3 is a side view of the bicycle being moved from the unfolded position to a folded position.
Figure 4:
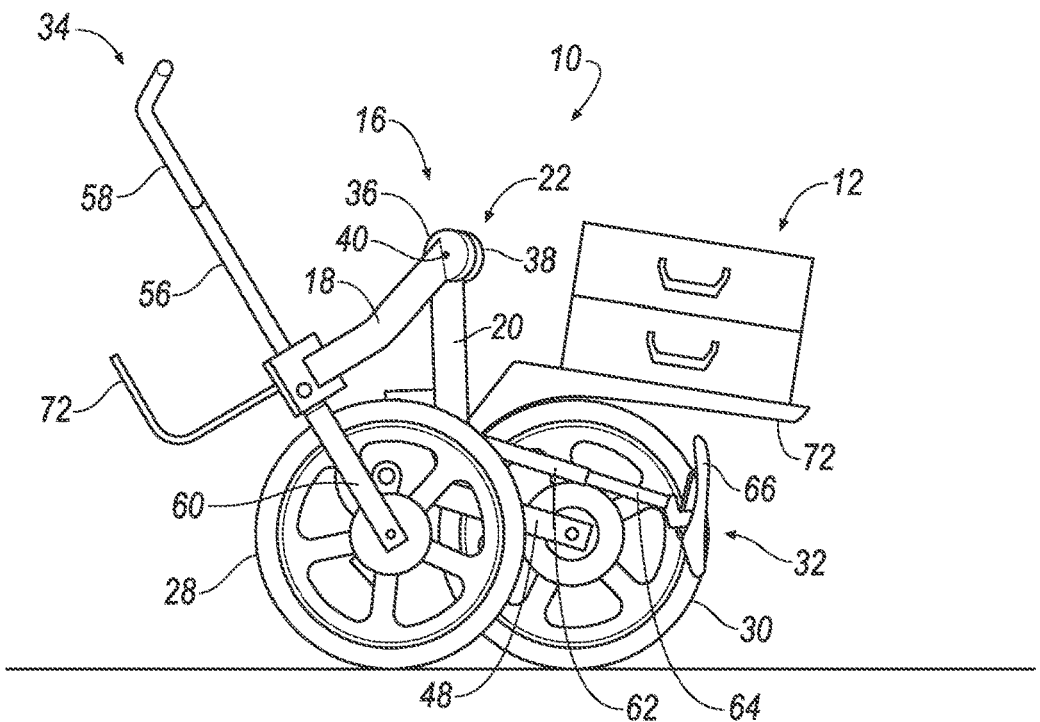
FIG. 4 is a side view of the bicycle being moved further from the unfolded position to the folded position.
Figure 5:
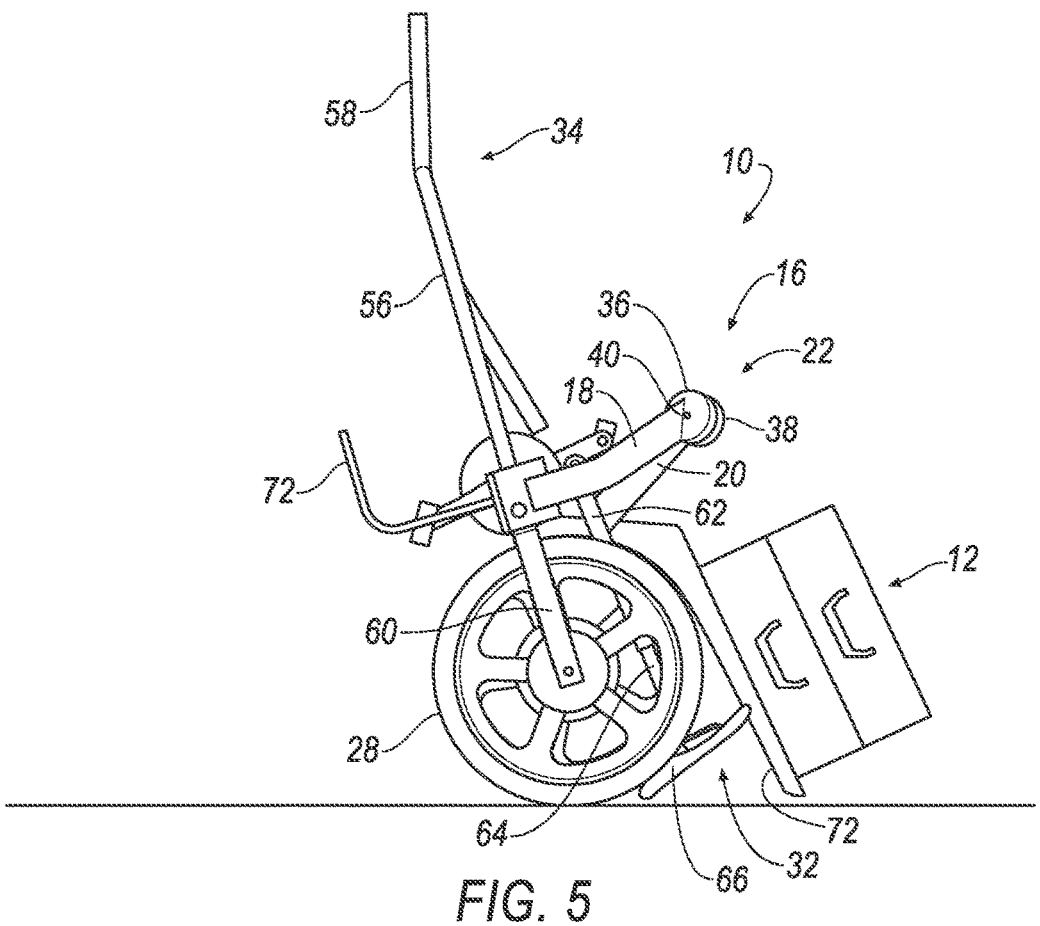
FIG. 5 is a side view of the bicycle in the folded position.
Figure 6:
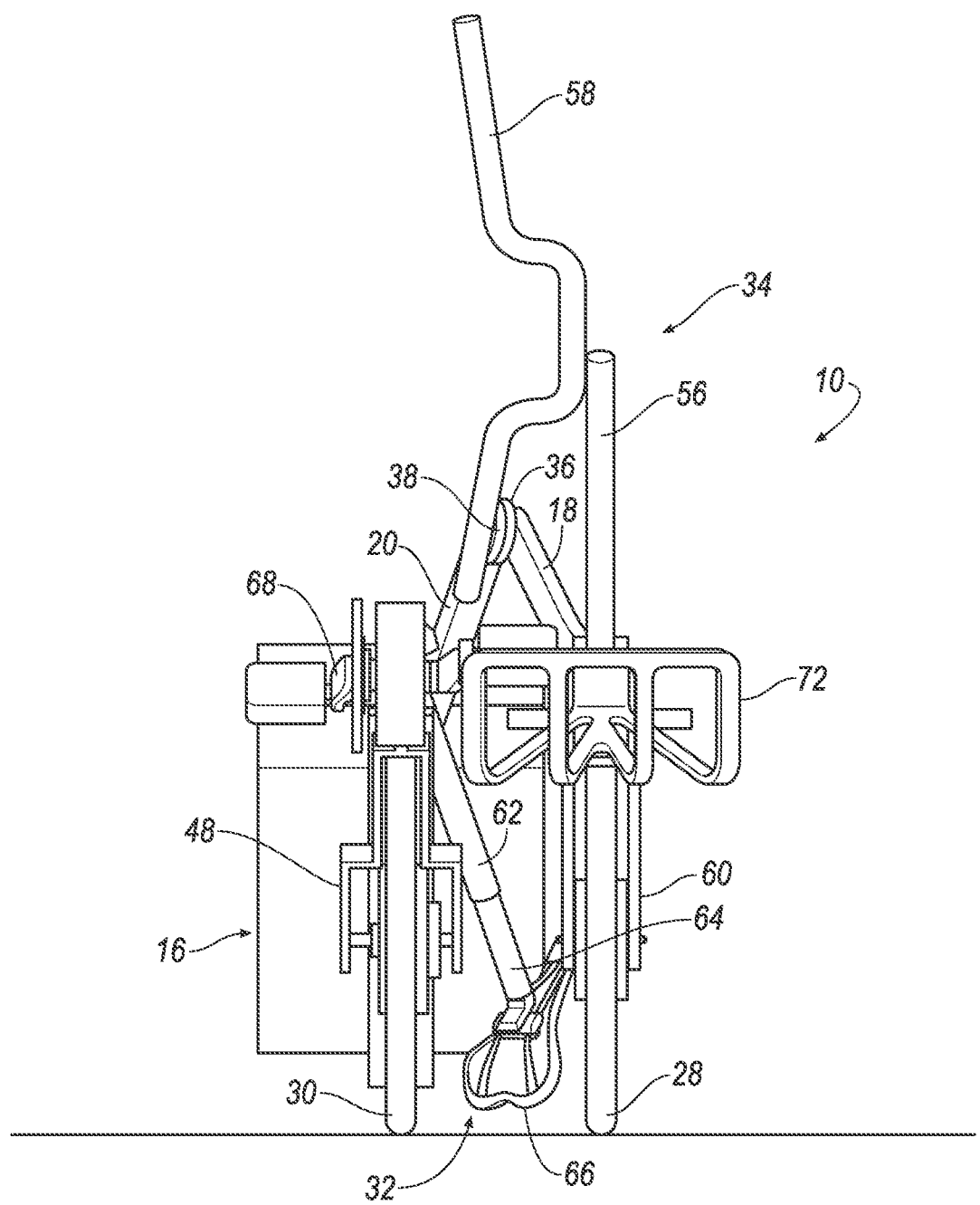
FIG. 6 is a front view of the bicycle in the folded position.

With reference to the Figures, wherein like numerals indicate like parts throughout the several views, a bicycle 10 is foldable between an unfolded position, as shown in FIGS. 1 and 3, to a folded position, as shown in FIGS. 5 and 6. In the unfolded position, the bicycle 10 may be operated by a seated user (not shown), and may support cargo 12, e.g., luggage, briefcase, groceries, or any other type of cargo 12. In the folded position, the bicycle 10 may be pushed and/or pulled to transport the cargo 12, i.e., may operate as a hand-cart. The cargo 12 may remain on the bicycle 10 while the bicycle 10 is folded from the unfolded position to the folded position, as shown in FIGS. 2-5.

Figure 7A:
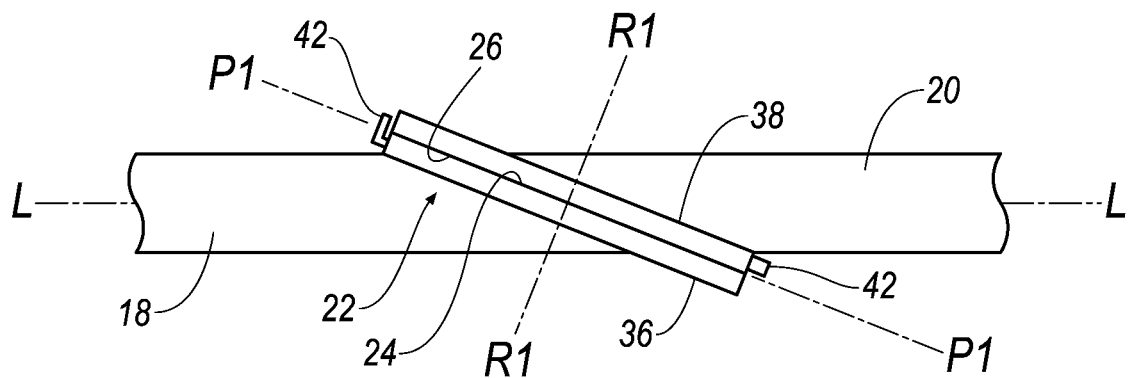
FIG. 7A is a top view of a first hinge of the bicycle when the bicycle is in the unfolded position.
Figure 7B:
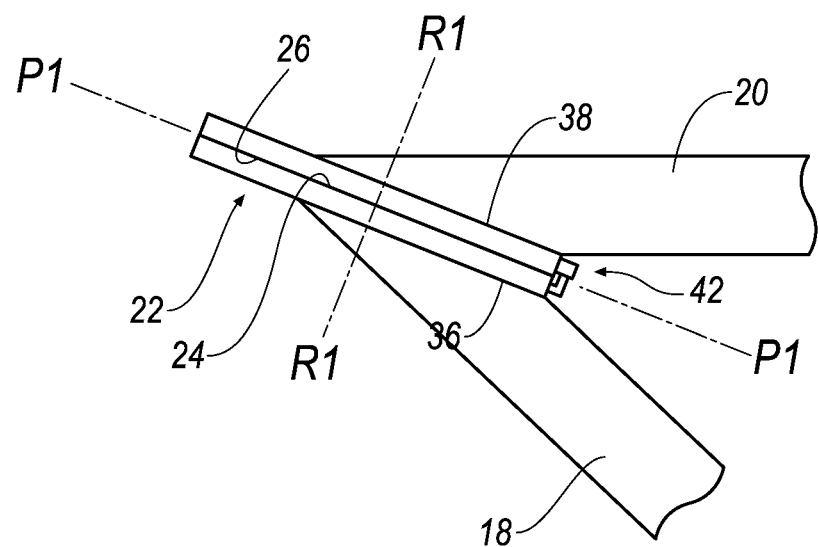
FIG. 7B is a top view of the first hinge of the bicycle when the bicycle is in the folded position.

With reference to FIGS. 1 and 2, the bicycle 10 includes a frame assembly 14 including a frame 16. The frame 16 has a first segment 18 and a second segment 20. The first segment 18 and the second segment 20 are each elongated along a longitudinal axis L. A first hinge 22 includes a first face 24 on the first segment 18 and a second face 26 on the second segment 20. The first face 24 and the second face 26 abut each other in the plane P1 and are rotatable relative to each other in the plane P1. The plane P1 extends at a non-right angle, i.e., greater than 0° and less than 90°, relative to the longitudinal axis L, as shown in FIGS. 1 and 7A-7B. In other words, the first hinge 22 is asymmetric.

As shown in FIG. 1, the first segment 18 and the second segment 20 are elongated along the longitudinal axis L when the bicycle 10 is in the unfolded position. Since the plane P1 extends at a non-right angle relative to the longitudinal axis L, when the first segment 18 and the second segment 20 are rotated to the folded position, the first segment 18 and the second segment 20 extend from the first hinge 22 at an angle relative to each other, e.g., in a V-shape, as shown in FIG. 7B. As such, in the folded position, a front wheel 28 and a rear wheel 30 of the bicycle 10 are spaced from each other to provide stability to the bicycle 10 in the folded position, e.g., to aid in ease of carrying the cargo 12. In addition, since the front wheel 28 and the rear wheel 30 are spaced from each other, a seat assembly 32 and a handlebar assembly 34 of the bicycle 10 may be disposed between the front wheel 28 and the rear wheel 30, as set forth further below, to decrease the size of the bicycle 10 in the folded position and/or to aid in the ease of pulling/pushing the bicycle 10 while loaded with cargo 12.

With reference to FIGS. 1 and 7A-7B, the first face 24 and the second face 26 are rotatable relative to each other about a rotational axis R1. The rotational axis R1 is transverse to the longitudinal axis L, i.e. the first hinge 22 is asymmetric. In other words, the rotational axis R1 extends at a non-right angle relative to the longitudinal axis L. As set forth above, the first segment 18 and the second segment 20 are elongated along the longitudinal axis L when the bicycle 10 is in the unfolded position. As such, when the bicycle 10 is moved to the folded position, the first segment 18 and the second segment 20 extend from the first hinge 22 at an angle relative to each other, e.g., in a V-shape, as shown in FIG. 7B, providing the benefits described above.

The first hinge 22 may be of any suitable type. For example, with reference to FIGS. 1 and 7A-B, the first hinge 22 may include a first plate 36 presenting the first face 24, a second plate 38 presenting the second face 26, and a pin 40 rotatably engaging the first plate 36 and the second plate 38. In other words, the pin 40 may extend along the rotational axis R1 and the first plate 36 and the second plate 38 may rotate about the first hinge 22 between the folded position and the unfolded position. Alternatively, the first hinge 22 may be of any suitable type that allows the first segment 18 and the second segment 20 to rotate about the rotational axis R1.

As set forth above, the first face 24 and the second face 26 abut each other in the plane P1 and are rotatable relative to each other in the plane P1. For example, the first plate 36 and the second plate 38 may be cylindrical, and the first face 24 and the second face 26 may have a circular periphery. The first face 24 and the second face 26 may be planar across the entire periphery, as shown in the Figures. Alternatively, in addition to planar segments, the first face 24 and the second face 26 may be include non-planar segments.

The first hinge 22 may include a stop 42 positioned to prevent relative rotation of the first segment 18 and the second segment 20 at a folded position as the first segment 18 and the second segment 20 move from an unfolded position to the folded position. The stop 42 may, for example, include protrusions on the first plate 36 and the second plate 38 of the first hinge 22, as shown in FIGS. 7A-B. The protrusions are positioned to be spaced from each other about the rotational axis when the frame 16 is in the unfolded position, as shown in FIG. 7A, and are aligned with each other to abut when the frame 16 is moved to the folded position, as shown in FIG. 7B. Alternatively, the stop 42 may be of any suitable design.

As set forth above, the first segment 18 and the second segment 20 of the frame 16 are each elongated along the longitudinal axis L. In other words, the first segment 18 and the second segment 20 are elongated in directions parallel with the longitudinal axis L, and can be on the longitudinal axis L or spaced from the longitudinal axis L.

At least one of the first segment 18 and the second segment 20 includes a curved segment 44 curving relative to the longitudinal axis L. For example, with reference to FIG. 1, the first segment 18 includes a straight segment 46 and the curved segment 44 disposed between the straight segment 46 and the handlebar assembly 34. The curved segment 44 may be designed, e.g., sized and shaped, to position the front wheel 28 and the rear wheel 30 in parallel when the frame 16 is folded to the folded position.

Figure 8A:
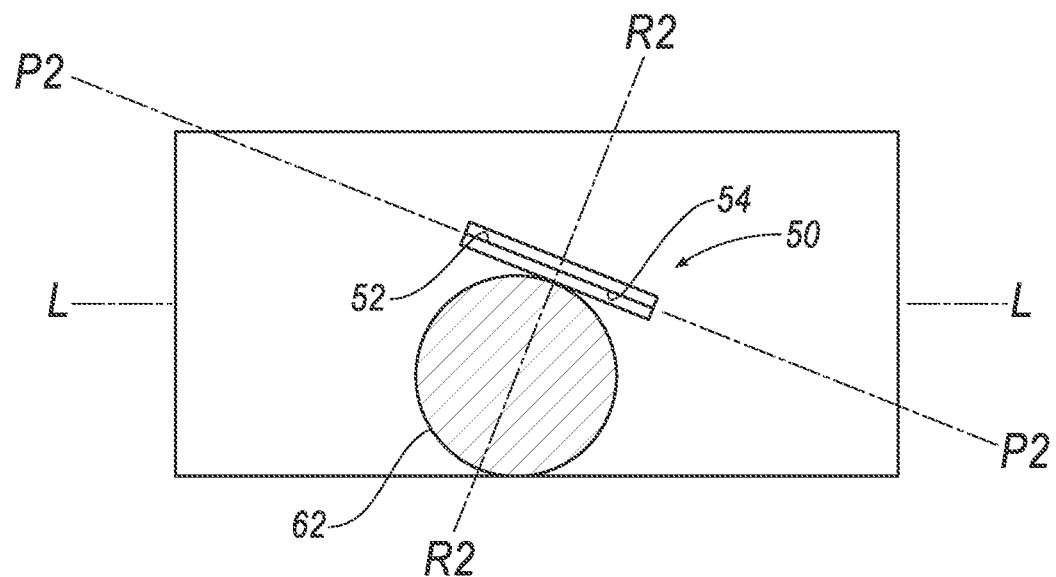
FIG. 8A is a top view of a second hinge of the bicycle when the bicycle is in the unfolded position.
Figure 8B:
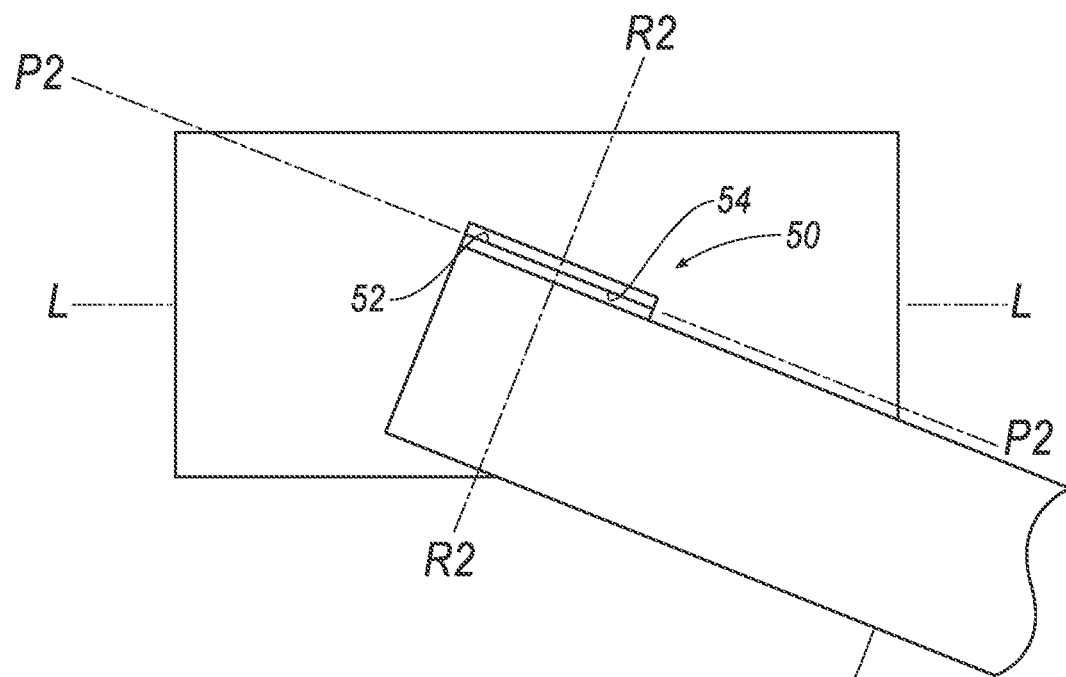
FIG. 8B is a top view of the second hinge of the bicycle when the bicycle is in the folded position.

With reference to FIGS. 1-6, and 8A-B, the frame 16 includes a third segment 48 and a second hinge 50 connecting the second segment 20 and the third segment 48. With reference to FIGS. 8A-B, the second hinge 50 is rotatable about a second rotational axis R2 extending at a non-right angle relative to the longitudinal axis L. The second rotational axis R2 is transverse to the longitudinal axis L. In other words, the second hinge 50 is asymmetric.

The second hinge 50 includes a first face 52 and a second face 54 abutting each other in a plane P2. The plane P2 extends at a non-right angle, i.e., greater than 0° and less than 90°, relative to the longitudinal axis L, as shown in FIGS. 1 and 8A-8B. In other words, the second hinge 50 is asymmetric.

With reference to FIG. 1, the first segment 18 supports the handlebar assembly 34 and the front wheel 28. Specifically, the front wheel 28 is connected to the first segment 18 through the handlebar assembly 34.

The handlebar assembly 34 may be fixed to the first segment 18. With reference to FIGS. 1 and 3, the handlebar assembly 34 may, for example, include a stem 56 rotatably connected to the first segment 18. A handlebar 58 is supported on the stem 56 for steering by a driver of the bicycle 10. The handlebar assembly 34 may include a fork 60 rotatably supporting the front wheel 28. The first segment 18 may rotatably support the fork 60 and the 56 stem may be connected to the fork 60 for rotating the fork 60 relative to the first segment 18.

The handlebar 58 may be rotatably supported on the stem 56, and may be rotated to an extended position, as shown in FIGS. 1-4, to a stowed position, as shown in FIGS. 5 and 6. In the stowed position, the handlebar 58 may be used as a handle to pull and/or push the bicycle 10 in the folded position. The handlebar 58 may be rotatably supported on the stem 56 in any suitable fashion, e.g., with a hinge, joint, etc.

The second segment 20 may support the seat assembly 32. Specifically, the seat assembly 32 may include a seat tube 62 engaged with the second segment 20, a post 64 engaged with the seat tube 62, and a saddle 66 connected to the post 64. The post 64 may be telescopically connected to the seat tube 62 such that the post 64 and the saddle 66 may be selectively retracted into and extended from the seat tube 62. The saddle 66 may be fixed to the seat tube 62. When the bicycle 10 is folded to the folded position, the post 64 may be telescopically retracted into the seat tube 62, as shown in FIGS. 4-6.

The rear wheel 30 may be fixed to the third segment 48. The third segment 48 may support a crank 68 and/or a motor 70 for propelling the bicycle 10. The crank 68 and/or the motor 70 may be coupled to the rear wheel 30 with, for example, a belt (not shown) or chain (not shown). The crank 68 and the motor 70 may be used independently or simultaneously to propel the bicycle 10. For example, the crank 68 may be used independently to propel the bicycle 10 by pedaling the crank 68 in a forward rotational direction without input from the motor 70. The motor 70 may be used independently to propel the electric bicycle 10 and/or may be used simultaneously with the crank 68 to assist in pedaling.

With reference to FIG. 1, the frame 16 may support racks 72 for supporting the cargo 12. For example, the frame 16 in FIG. 1 includes one rack 72 supported on the first segment 18 and one rack 72 supported on the second segment 20. The racks 72 may be fixed to the frame 16 to move with the frame 16 as the frame 16 moves between the folded position and the unfolded position. The bicycle 10 may include any suitable number of racks 72 on any segment of the frame 16.

The frame assembly 14 may include a lock 73 releasably engageable with at least one of the first hinge 22 and the second hinge 50. The lock 73 may lock the frame 16 in the unfolded position, and may release the frame 16 to be folded to the folded position. The lock 73 may include a first latch 74 at the first hinge 22, a second latch 76 at the second hinge 50, a cord 78 connected to the first latch 74 and the second latch 76, and a switch 80 connected to the cord 78.

The lock 73 may be supported on the second segment 20. For example, the cord 78 extends inside the frame 16 between the first latch 74, the second latch 76, and the switch 80.

Figure 9A:
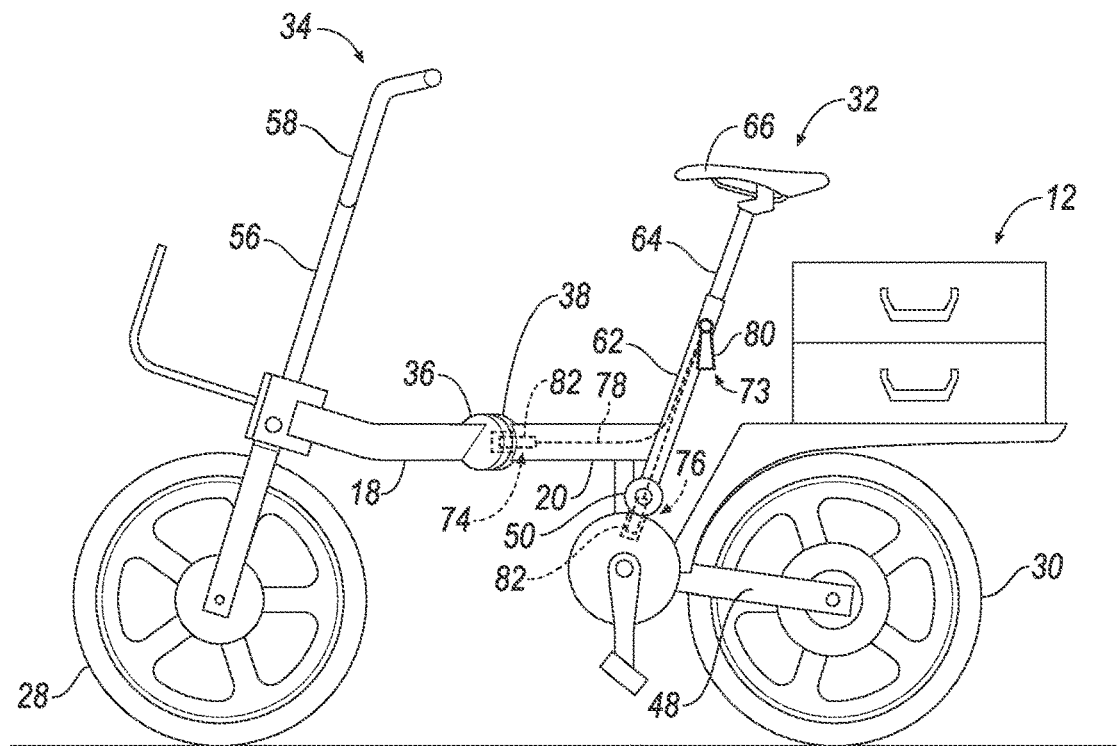
FIG. 9A is a side view of the bicycle in the unfolded position with a lock engaged with the first hinge and the second hinge.
Figure 9B:
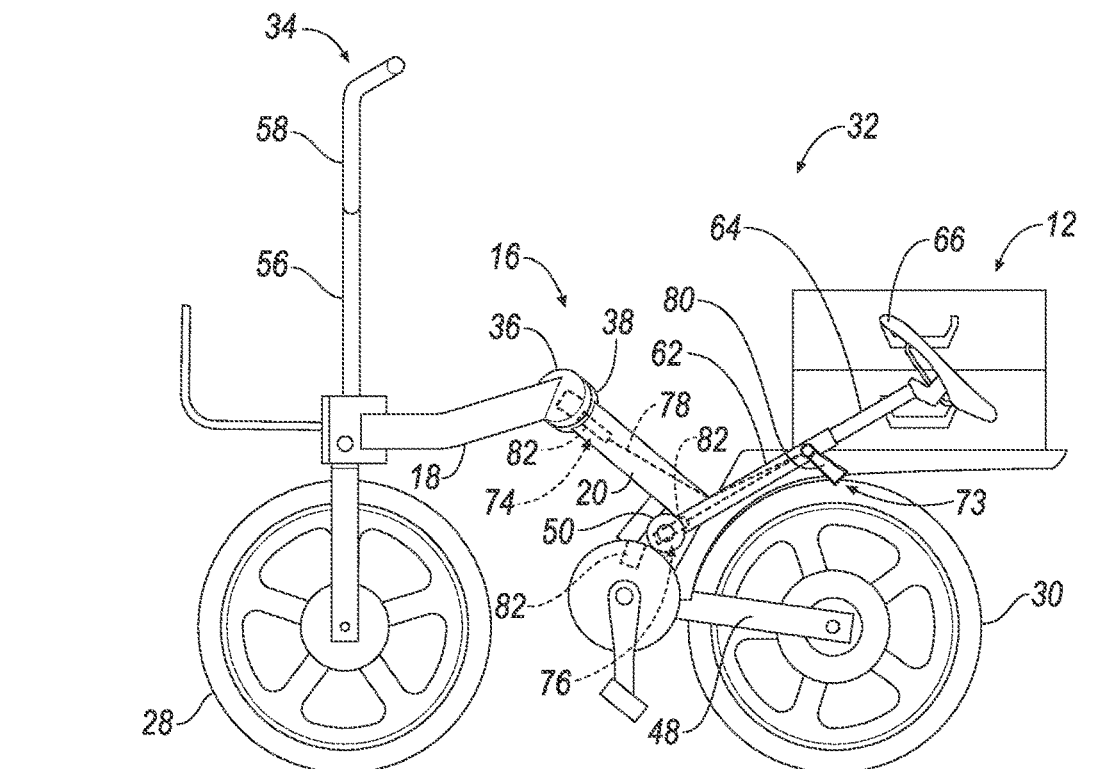
FIG. 9B is a side view of the bicycle between the folded position and the unfolded position with the lock disengaged with the first hinge and the second hinge.
Figure 10A:
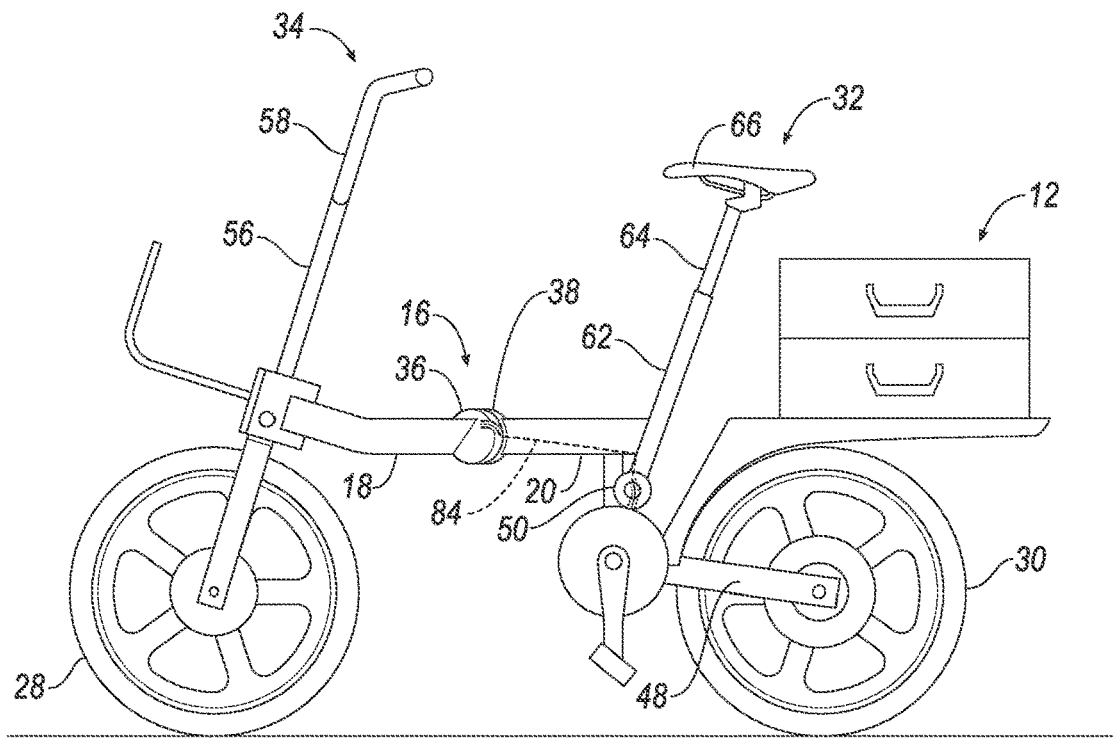
FIG. 10A is a side view of the bicycle in the unfolded position showing a synchronization cable in hidden lines.
Figure 10B:
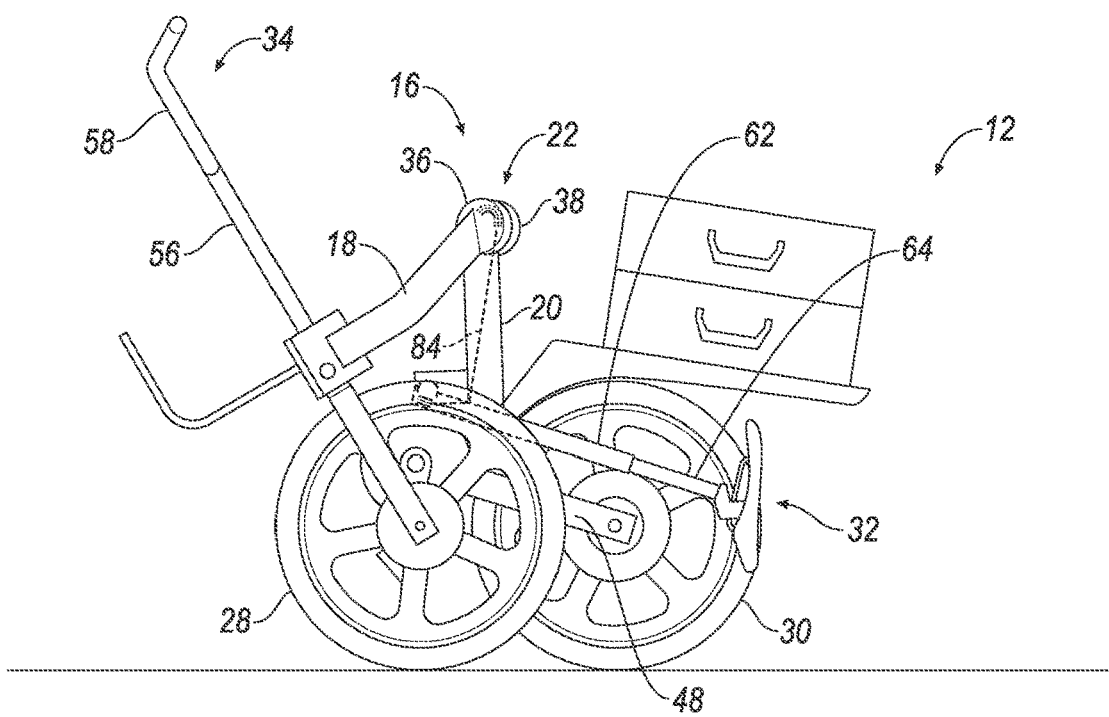
FIG. 10B is a side view of the bicycle in the folded position showing a synchronization cable in hidden lines.

For example, the first latch 74 and the second latch 76 may include pins 82 slideably supported in the second segment 20 and moveable into and out of engagement with the first hinge 22 and the second hinge 50. When pins 82 are engaged with the first hinge 22 and the second hinge 50, as shown in FIG. 9A, the pins 82 prevent rotation of the first hinge 22 and the second hinge 50 about the rotational axis R1 and the rotational axis R2, respectively. The first hinge 22 and the second hinge 50 may, for example, define pockets that receive the pins 82, as shown in FIGS. 9A-B.

The switch 80 may be of any suitable type. For example, as shown in the Figures, the switch 80 may be a lever supported on the second segment 20, e.g., on the seat tube 62. The lever may be connected to the cord 78 to retract the cord 78 to pull the pins 82 from engagement with the first hinge 22 and the second hinge 50, and to extend the cord 78 to allow the pins 82 to engage the first hinge 22 and the second hinge 50. The pins 82 and/or the cord 78 may be spring loaded to bias the pins 82 into engagement with the first hinge 22 and the second hinge 50, and the spring loaded bias may be overcome by movement of the lever. For example the cord 78 may be a Bowden cable. FIGS. 9A and 9B shows the lock 73 designed to engage both the first hinge 22 and the second hinge 50, i.e., a pin 82 at each of the first hinge 22 and the second hinge 50. Alternatively, the lock 73 may engage only the first hinge 22 or the second hinge 50, i.e., may include only a single pin 82 at the first hinge 22 or a single peg at the second hinge 50. As set forth further below, the lock 73 may be electronically controlled in addition to, or in the alternative to, the mechanical connection of the switch 80, cord 78, and pins 82.

With reference to FIGS. 10A-11B, the frame assembly 14 may include a synchronization cable 84 extending through the second segment 20 from the first hinge 22 to the second hinge 50. The synchronization cable 84 synchronizes movement of the first segment 18, the second segment 20, and the third segment 48 between the unfolded position and the folded position.

Figure 11A:
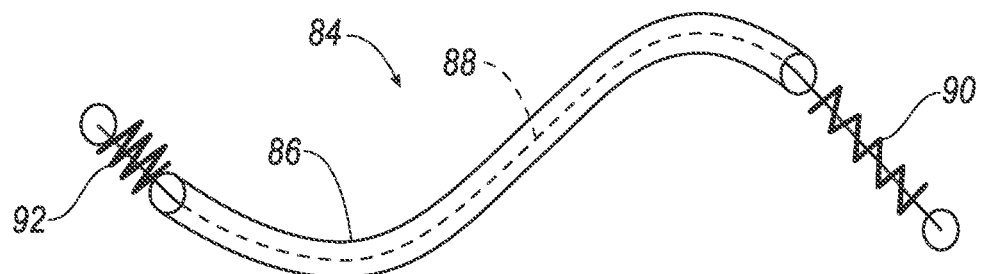
FIG. 11A is a side view of the synchronization cable when the bicycle is in the unfolded position.
Figure 11B:
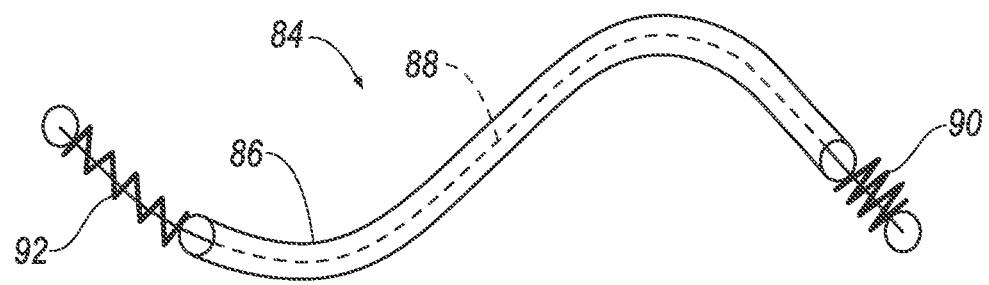
FIG. 11B is a side view of the synchronization cable when the bicycle is in the folded position.

With reference to FIGS. 11A-B, the synchronization cable 84 includes a sheath 86 and an inner cable 88 is slideably disposed in and spring-loaded with the sheath 86. The inner cable 88 extends from a first end at the first hinge 22 to a second end at the second hinge 50. The first end may be connected to the first hinge 22 or, alternatively, may be connected to the first segment 18. The second end may be connected to the second hinge 50, or alternatively, may be connected to the third segment 48.

A first spring 90 is mounted on the inner cable 88 between the first end and the sheath 86, and a second spring 92 is mounted on the inner cable 88 between the second end and the sheath 86. The second spring 92 has a larger spring constant than the first spring 90. As such, during unfolding, the second end of the inner cable 88 moves away from the sheath 86 and the second spring 92 is extended, i.e., uncompressed, to bias the second segment 20 and the third segment 48 toward the unfolded position. As the inner cable 88 moves through the sheath 86 during the unfolding process, the first end of the inner cable 88 moves toward the sheath 86 to compress first spring 90 to bias first segment 18 and the second segment 20 toward the unfolded position. The movement of the inner cable 88 through the sheath 86 synchronizes movement of the first segment 18 and the third segment 48 relative to the second segment 20 as the frame 16 is folded.

As the frame 16 is folded, the second end of the inner cable 88 moves toward the sheath 86 such that the second spring 92 is compressed. As the inner cable 88 moves through the sheath 86 during the folding process, the first end of the inner cable 88 moves away from the sheath 86 to extend the first spring 90. The first spring 90 biases the inner cable 88 as the second spring 92 is compressed. This movement of the inner cable 88 synchronizes the movement of the first segment 18 and the third segment 48 relative to the second segment 20 as the frame 16 is folded.

The synchronization cable 84 assist in manual movement of the frame 16 between the folded position and the unfolded position, i.e., with input from a user and/or power provided by rotating the rear wheel 30, as set forth below. Alternatively, for example, the synchronization cable 84 may be moved with the use of a motor (not shown) that pulls and releases the inner cable 88 to allow the frame 16 to move between the folded position and the unfolded position.

Figure 14:
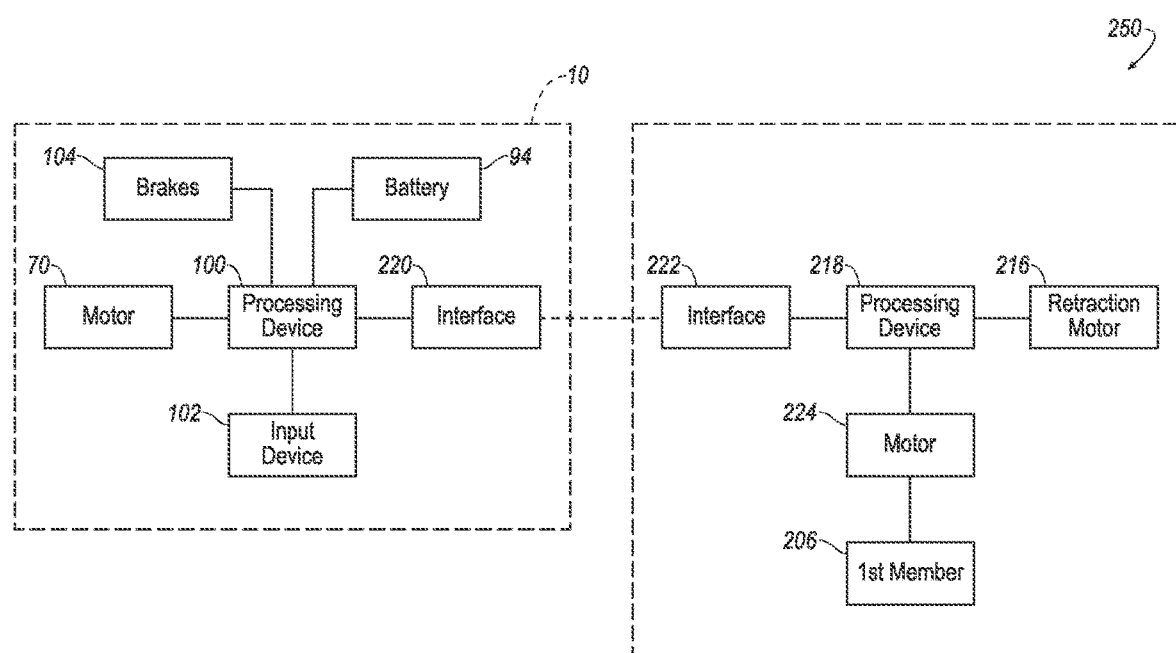
FIG. 14 is a schematic of the bicycle and the storage system.

With reference to FIG. 14, the bicycle 10 may include a battery 94 and the motor 70. In other words, the bicycle 10 may be an electric bicycle 10. The motor 70 and/or the battery 94 may be supported on a crank casing 96 of the bicycle 10. The crank casing 96 may be supported on the third segment 48 of the frame 16.

The battery 94 is connected to the motor 70 to provide power to the motor 70. The motor 70 may be of any suitably type. For example, the motor 70 may be an electric motor. The battery 94 may be of any suitable type, for example, a multiple cell lithium ion battery 94.

The bicycle 10 may include a processing device 100 in communication with the motor 70 for controlling the motor 70. The processing device 100 may include a processor, memory, etc. The memory of the processing device 100 may store instructions executable by the processor.

The bicycle 10 may include one or more input devices 102 for providing input to the processing device from a user of the bicycle 10. For example, the input devices 102 may be used to provide input to the processing device to control operation of the motor 70, to control operation of brakes 104 on the bicycle 10 that decelerate the rear wheel 30 and/or the front wheel 28, etc. The input device 102 may be of any physical type, e.g., handles, knobs, buttons, and/or may be of any electronic type, e.g., a human-machine interface (HMI) such as a touch screen, etc. In addition, the input devices 102 may include a lock input device such that the lock 73 is electronically controlled, e.g., in addition to or in the alternative to the lever of the lock 73 described above.

In operation, the bicycle 10 may be moved from the folded position to the unfolded position by first unlocking the lock 73, and subsequently rotating the first segment 18 and the second segment 20 about the first hinge 22 and moving the second segment 20 and the third segment 48 about the second hinge 50. The first hinge 22 and the second hinge 50 may be manually rotated, e.g., by pushing the handlebars 58 and the saddle 66 toward each other.

Alternatively, the first hinge 22 and the second hinge 50 may be automatically rotated. For example, the use of the bicycle 10 may stand next to the bicycle 10 and may apply the brakes 104 to the front wheel 28 while providing power from the motor 70 to the rear wheel 30. During this operation, the front wheel 28 remains stationary and the rear wheel 30 moves the third segment 48 and the second segment 20 relative to the first segment 18 toward the folded position. Similarly, to move the frame 16 to the unfolded position, the brakes 104 may be applied to the front wheel 28 while providing power from the motor 70 to the rear wheel 30 in a reverse direction.

Alternatively, the processing device 100 may be programmed to, e.g., the memory may store instructions including programming to, move the frame 16 between the folded position and the unfolded position in response to a signal from one of the input devices. For example, the user may operate a select one of the input devices 102, e.g., a folding input device such as a button, a selection on an HMI, etc. The memory of the processing device 100 may include instructions including programming to apply the brakes 104 to the front wheel 28 and to rotate the rear wheel 30 with power from the motor 70 in response to receiving a signal from the folding input device. In other words, when the user provides input to the folding input device, the processing device automatically instructs the brakes 104 and motor to move the frame 16 from the folded position to the unfolded position, or from the unfolded position to the folded position.

Figure 12A:
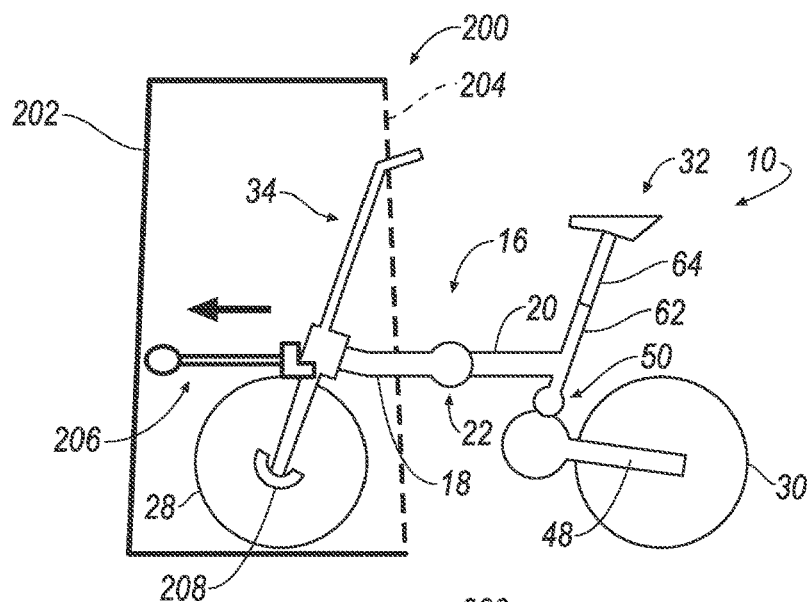
FIG. 12A is a side view of a storage system including a container receiving the bicycle.
Figure 12B:
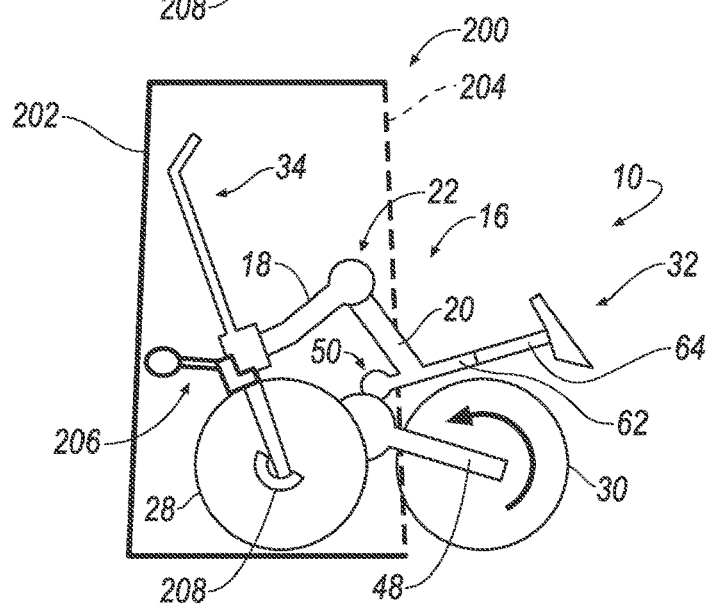
FIG. 12B is a side view of the storage system with a first member fixed to the container and receiving the bicycle, and a second member having an arm retracting the bicycle into the container.
Figure 12C:
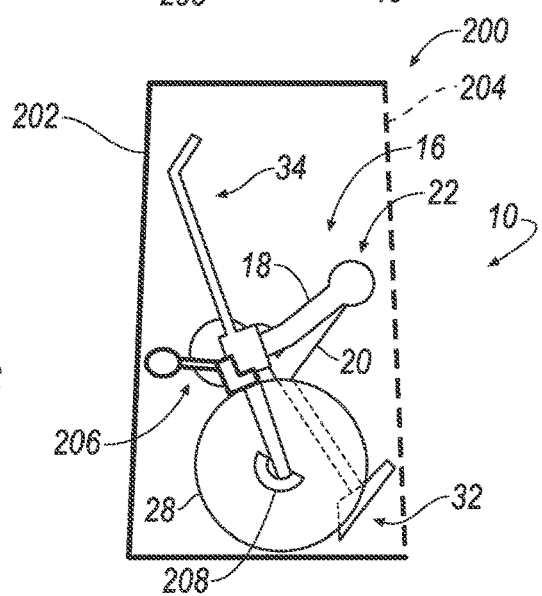
FIG. 12C is a side view of the storage system after a rear wheel was powered to fold the bicycle into the container.
Figure 13A:
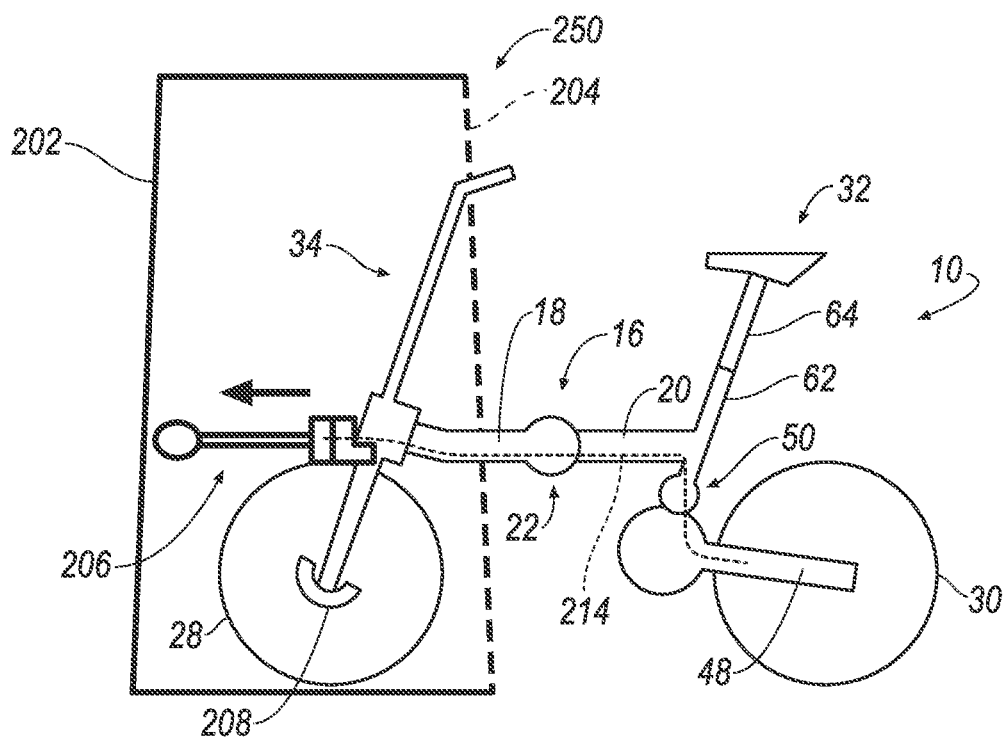
FIG. 13A is a side view of the storage system with a retraction motor the second member engaged with a cable in bicycle.
Figure 13B:
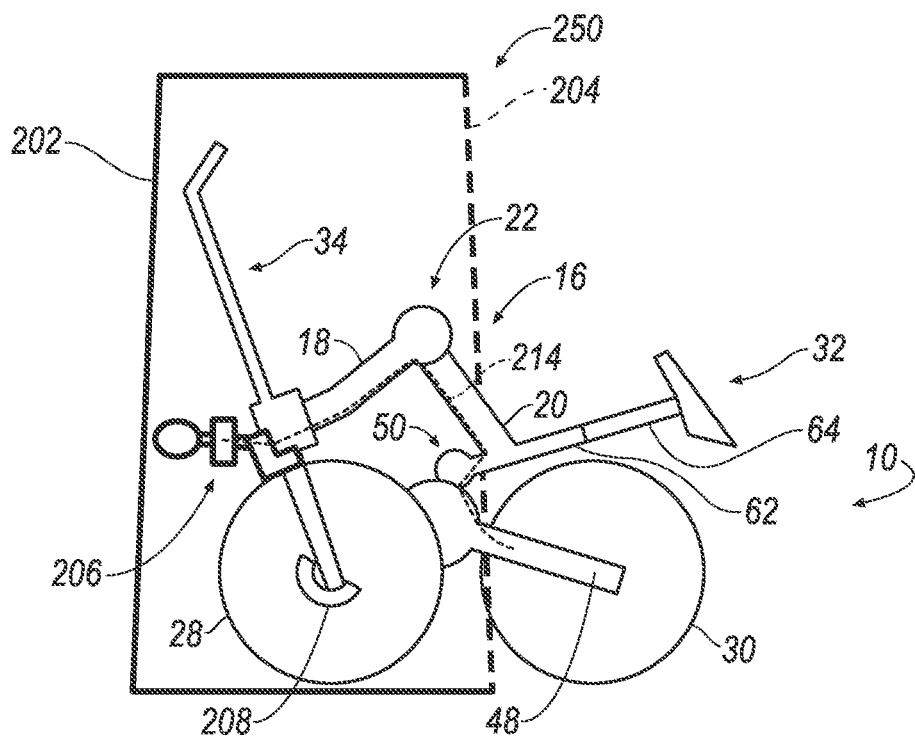
FIG. 13B is a side view of the storage system with the retraction motor retracting the cable to move the bicycle toward the folded position.

With reference to FIGS. 12A-C, a first embodiment of a bicycle storage system 200 is shown, and with reference to FIGS. 13A-B, a second embodiment of the bicycle storage system 250 is shown. The bicycle storage system 200, 250 of FIGS. 12A-13B may store the bicycle 10 described above, and/or any suitable folding bicycle 10. The bicycle storage system 200, 250 may be used in a bicycle rental system, as described further below. Alternatively, the bicycle storage system 200, 250 may be used to store individually owned bicycles 10, e.g., in a garage, shed, etc.

The storage system 200, 250 includes a container 202 including an opening 204. The storage system 200, 250 includes a first member 206 supported by the container 202 in the container 202 and positioned to engage the bicycle 10, and a second member 208 supported by the container 202 in the container 202 and positioned to engage the bicycle 10 spaced from the first member 206. The first member 206 is movable relative to the second member 208 toward and away from the opening 204.

With continued reference to FIGS. 12A-13B, the second member 208 may be fixed relative to the container 202. As shown in FIGS. 12A and 13A, the first segment 18 of the bicycle 10 may be inserted into the opening 204 of the container 202 and may be coupled to the second member 208 of the container 202, e.g., the fork 60 may be rested on and/or engaged with the second member 208.

With continued reference to FIGS. 12A and 13A, the first member 206 includes a base 210 fixed to the container 202 and an arm 212 extendable from the base 210. Specifically, the arm 212 is extendable toward and away from the opening 204. The first segment 18 of the bicycle 10 may be coupled with the first member 206. The first member 206 and the second member 208 may each include features, e.g., fingers, fasteners, etc. designed to engage the first segment 18 of the frame 16 of the bicycle 10. With reference to FIGS. 12B and 13B, the arm 212 may be retracted away from the opening 204 to pull the bicycle 10 into the opening 204. The system 200, 250 may include a motor 224 coupled to the arm 212 to move the arm 212 relative to the base 210.

With reference to FIG. 12B-C, the rear wheel 30 of the bicycle 10 may be powered by the motor 70 to move the third segment 48 of the frame 16 into the opening 204. During this movement, the rear wheel 30 forces the frame 16 to move from the unfolded position to the folded position. As shown in FIG. 12C, when in the folded position, the bicycle 10 may be stored in the container 202.

The steps shown in FIGS. 12A-C may be reversed to move the frame 16 to the unfolded position and to remove the bicycle 10 from the container 202. Specifically, the rear wheel 30 may be reversed exit the third segment 48 through the opening 204. The arm 212 may then be extended to push the frame 16 further through the opening 204. The first segment 18 may then be disengaged from the first member 206 and the second member 208 to remove the bicycle 10 from the container 202.

With reference to FIG. 13B, the bicycle 10 may include a cable 214 engaged with the second segment 20 and or the third segment 48. The first member 206 may include a retraction motor 216 supported on the first member 206, e.g., on the base of the first member 206. The retraction motor 216 may be engageable with the cable 214 to retract and extend the cable 214. In particular, as shown in FIG. 13B, the retraction motor 216 may retract the cable 214 into the container 202 to force the frame 16 to move from the unfolded position to the folded position. To remove the bicycle 10 from the container 202, the retraction motor 216 may extend the cable 214 to allow the frame 16 to move from the folded position to the unfolded position.

The system 200, 250 may include a processing device 218 programmed to, e.g., the memory may store instructions including programming to, move the bicycle 10 into and out of the container 202. Specifically, the processing device 218 may be programmed to output a signal to move the bicycle 10 from the unfolded position to the folded position when the bicycle 10 is engaged with the first member 206. For example, processing device 218 may be programmed to move the first member 206 away from the opening 204 and to power a motor 70 of the bicycle 10 when the first member 206 moves away from the opening 204.

The bicycle 10 may include a signal interface 220 and the container 202 may include a signal interface 222 positioned to engage the signal interface 220 of the bicycle 10. For example, one of the first member 206 and the second member 208 includes the signal interface 222 positioned to communicate with the signal interface 220 of the bicycle 10 when the bicycle 10 is engaged with the first member 206 and/or the second member 208. The interfaces 220, 222 may be of any suitable type, e.g., wired, wireless, etc.

Signals may be provided to, and received from, the processing device 218 of the system 200, 250 through the signal interface 222 of the system 220, 222. These signals may be in response to the introduction of the bicycle 10 to the container 202. For example, the signal may include at least a signal to the motor 224 of the container 202 to move the first member 206 relative to the container 202 after the first segment 18 is engaged with the first member 206 and the second member 208, as shown in FIGS. 12A and 13A. As another example, the signal may include at least a signal to the retraction motor 216 to retract the cable 214, as shown in FIG. 13B. Either of these two exemplary signals may be automatically initiated in response to detection of engagement of the bicycle 10 with the first member 206 and/or the second member 208.

Signals may be communicated through the signal interfaces 220, 222 between the processing device 218 of the system 200, 250 and the processing device of the bicycle 10. For example, the signal may include at least a signal to a motor 70 of the bicycle 10 to power the motor 70. Specifically, when the bicycle 10 is engaged with the first member 206 and/or the second member 208, the processing device 218 of the system 200, 250 may provide a signal to the processing device 100 of the bicycle 10 to provide power to the rear wheel 30 to move the rear wheel 30 into the opening 204, as shown in FIG. 12B.

As another example, the processing device 218 of the system 200, 250 and the processing device 100 of the bicycle 10 may exchange signals identifying mileage of the bicycle 10 since the last docking, battery 94 level, maintenance schedules, etc. The processing device 218 of the system 200, 250 may be programmed to output a signal to charge a battery 94 of the bicycle 10. The system 200, 250 may provide electricity through the signal interfaces 220, 222 to the battery 94 of the bicycle 10 to charge the battery 94.

The container 202 may be sized to receive the bicycle 10 in the folded position. In other words, the container 202 smaller than the bicycle 10 in the unfolded position. This configuration may improve packaging density of bicycle 10s, e.g., in a rental area.

The container 202 may be formed of any suitable material. The container 202 may include a door (not shown) that opens and closes to prevent theft and/or vandalism. When used in a rental system, the container 202 may include an input device, payment collection device, etc.

Processing devices 100, 218 such as those discussed herein generally each include instructions executable by one or more processing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a processing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A bicycle frame assembly comprising:
a frame including a first segment, a second segment connected to the first segment at a first hinge, and a third segment connected to the second segment at a second hinge;
a front wheel and a handlebar assembly connected to the first segment;
a seat assembly connected to the third segment;
a rear wheel connected to the third segment; and
a synchronization cable extending through the second segment from the first hinge to the second hinge;
the first segment and the second segment of the frame being elongated along a longitudinal axis, and the first hinge rotates about a first rotational axis transverse to the longitudinal axis and the second hinge rotates about a second rotational axis transverse to the longitudinal axis, the first hinge and the second hinge being spaced from each other along the longitudinal axis;
the first hinge including faces abutting each other in a first plane, the first plane extending at a non-right angle relative to the longitudinal axis, the first rotational axis of the first hinge extending through the faces of the first hinge;
the second hinge including faces abutting each other in a second plane, the second plane extending at a non-right angle relative to the longitudinal axis, the second rotational axis of the second hinge extending through the faces of the second hinge.

2. The bicycle frame assembly as set forth in claim 1 wherein the synchronization cable includes a sheath and an inner cable is slideably disposed in and spring-loaded with the sheath.

3. The bicycle frame assembly as set forth in claim 2 wherein the inner cable extends from a first end at the first hinge to a second end at the second hinge.

4. The bicycle frame assembly as set forth in claim 3 wherein the synchronization cable includes a first spring between the first end and the sheath, and a second spring between the second end and the sheath.

5. The bicycle frame assembly as set forth in claim 4 wherein the second spring has a larger spring constant than the first spring.

6. The bicycle frame assembly as set forth in claim 1 further comprising a lock releasably engageable with the first hinge and releasably engageable with the second hinge.

7. The bicycle frame assembly as set forth in claim 6 wherein the lock includes a first latch at the first hinge, a second latch at the second hinge, a cord connected to the first latch and the second latch, and a switch connected to the cord.

8. The bicycle frame assembly as set forth in claim 7 wherein the cord extends inside the frame between the first latch, the second latch, and the switch.

9. The bicycle frame assembly as set forth in claim 6 wherein the hinge includes a stop positioned to prevent relative rotation of the first segment and the second segment at a folded position as the first segment and the second segment move from an unfolded position to the folded position.

10. The bicycle frame assembly as set forth in claim 1 further comprising a motor supported by the third segment.

11. The bicycle frame assembly as set forth in claim 1 wherein the hinge includes a stop positioned to prevent relative rotation of the first segment and the second segment at a folded position as the first segment and the second segment move from an unfolded position to the folded position.

12. A bicycle frame assembly comprising:
a frame including a first segment, a second segment connected to the first segment at a first hinge, and a third segment connected to the second segment at a second hinge; and
a synchronization cable extending through the second segment from the first hinge to the second hinge;
wherein the synchronization cable includes a sheath and an inner cable is slideably disposed in and spring-loaded with the sheath;
wherein the inner cable extends from a first end at the first hinge to a second end at the second hinge;
wherein the synchronization cable includes a first spring between the first end and the sheath, and a second spring between the second end and the sheath; and
wherein the second spring has a larger spring constant than the first spring.

13. The bicycle frame assembly as set forth in claim 12 further comprising a lock releasably engageable with the first hinge and releasably engageable with the second hinge.

14. The bicycle frame assembly as set forth in claim 12 further comprising a front wheel connected to the first segment, and a rear wheel connected to the third segment.

15. The bicycle frame assembly as set forth in claim 12 further comprising a motor supported by the third segment.

\* \* \* \* \*